(12) United States Patent
Felter et al.

(10) Patent No.: US 9,329,657 B2
(45) Date of Patent: *May 3, 2016

(54) CUSTOMIZED POWER RATING FOR COMPUTER EQUIPMENT

(75) Inventors: Wesley M. Felter, Austin, TX (US); Juan C. Rubio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/453,566

(22) Filed: Apr. 23, 2012

(65) Prior Publication Data

US 2012/0210145 A1    Aug. 16, 2012

Related U.S. Application Data

(63) Continuation of application No. 12/685,928, filed on Jan. 12, 2010, now Pat. No. 9,235,250.

(51) Int. Cl.
  *G06F 1/32*       (2006.01)
  *G06Q 10/10*    (2012.01)
(52) U.S. Cl.
  CPC ............ *G06F 1/3203* (2013.01); *G06F 1/3206* (2013.01); *G06Q 10/10* (2013.01)
(58) Field of Classification Search
  CPC ...... G06F 1/3203; G06F 1/3206; G06Q 10/10
  USPC .............. 713/300, 320; 700/291, 295; 702/60
  See application file for complete search history.

(56) References Cited

U.S. PATENT DOCUMENTS

| | | | |
|---|---|---|---|
| 6,330,516 B1 | 12/2001 | Kammeter |
| 6,804,616 B2 | 10/2004 | Bodas |
| 6,870,387 B2 | 3/2005 | Huang et al. |
| 6,968,470 B2 | 11/2005 | Larson et al. |
| 6,986,069 B2 | 1/2006 | Oehler et al. |
| 7,095,324 B2 | 8/2006 | Conwell et al. |
| 7,210,048 B2 | 4/2007 | Bodas |
| 7,307,529 B2 | 12/2007 | Gutnik et al. |
| 7,353,410 B2 | 4/2008 | Desai et al. |

(Continued)

OTHER PUBLICATIONS

Reply Brief filed Mar. 6, 2013, U.S. Appl. No. 12/685,928, 9 pages.

(Continued)

*Primary Examiner* — Stefan Stoynov
(74) *Attorney, Agent, or Firm* — Stephen R. Tkacs; Stephen J. Walder, Jr.; William J. Stack

(57) ABSTRACT

A mechanism is provided for customized power rating for computer equipment. A power monitor determines actual power consumption by computer equipment in a facility. After equipment has been stressed, an operator sends the actual power consumption information to the manufacturer. The manufacturer receives the actual power consumption information and issues a certificate that acknowledges the equipment will not consume more power than what was measured. The manufacturer may provide digital media that instructs power management hardware in the computer equipment to adhere to an actual case power limit. The power management hardware treats the actual case power limit as a hard power limit. That is, the power management hardware will not specify a power cap higher than the actual case power limit. The power management hardware prevents the equipment from crossing the actual case power limit.

16 Claims, 4 Drawing Sheets

(56) References Cited

U.S. PATENT DOCUMENTS

| | | | |
|---|---|---|---|
| 7,363,516 | B2 | 4/2008 | Bresniker et al. |
| 7,444,526 | B2 | 10/2008 | Felter et al. |
| 7,539,881 | B2 | 5/2009 | Shaw et al. |
| 7,747,354 | B2 | 6/2010 | Papallo et al. |
| 7,865,272 | B2 | 1/2011 | Spitaels et al. |
| 7,895,455 | B2 | 2/2011 | Green et al. |
| 8,006,108 | B2 | 8/2011 | Brey et al. |
| 8,132,034 | B2 | 3/2012 | Lambert et al. |
| 8,352,757 | B2 | 1/2013 | Egan et al. |
| 8,519,843 | B2 | 8/2013 | El-Essawy et al. |
| 8,713,297 | B2 | 4/2014 | McCarthy |
| 2006/0133175 | A1 | 6/2006 | Gutnik et al. |
| 2006/0206730 | A1 | 9/2006 | Cartes et al. |
| 2007/0010916 | A1 | 1/2007 | Rodgers et al. |
| 2008/0030078 | A1 | 2/2008 | Whitted et al. |
| 2008/0189700 | A1 | 8/2008 | Schmidt et al. |
| 2008/0320322 | A1 | 12/2008 | Green et al. |
| 2009/0125737 | A1 | 5/2009 | Brey et al. |
| 2009/0271725 | A1 | 10/2009 | Dirla |
| 2010/0235654 | A1 | 9/2010 | Malik |
| 2011/0144818 | A1 | 6/2011 | Li et al. |
| 2012/0078430 | A1 | 3/2012 | Fan et al. |

OTHER PUBLICATIONS

Appeal Brief filed Dec. 4, 2012, U.S. Appl. No. 12/685,928, 17 pages.

Examiner's Answer mailed Jan. 10, 2013 for U.S. Appl. No. 12/685,928, 20 pages.

Notice of Allowance mailed Nov. 1, 2012 for U.S. Appl. No. 13/451,181; 6 pages.

Office Action mailed Apr. 30, 2012 for U.S. Appl. No. 12/685,928; 20 pages.

Office Action mailed May 24, 2012 for U.S. Appl. No. 12/686,008; 14 pages.

Preliminary Amendment filed Apr. 24, 2012, U.S. Appl. No. 12/685,928, 6 pages.

U.S. Appl. No. 13/590,733, 1 page.

Final Office Action mailed Aug. 13, 2012, U.S. Appl. No. 12/685,928, 19 pages.

Interview Summary mailed Aug. 20, 2012 for U.S. Appl. No. 12/686,008; 3 pages.

Notice of Allowance mailed Aug. 31, 2012 for U.S. Appl. No. 12/686,008; 6 pages.

Office Action mailed Jul. 26, 2012 for U.S. Appl. No. 13/451,181; 11 pages.

Preliminary Amendment filed Aug. 21, 2012 for U.S. Appl. No. 13/215,565; 6 pages.

Response to Office Action filed Jul. 27, 2012, U.S. Appl. No. 12/685,928, 13 pages.

Response to Office Action filed Aug. 22, 2012, U.S. Appl. No. 12/686,008, 10 pages.

Response to Office Action filed Sep. 21, 2012, U.S. Appl. No. 13/451,181, 6 pages.

International Search Report and Written Opinion dated May 11, 2011 in International Application No. PCT/EP2011/050070, 7 pages.

USPTO U.S. Appl. No. 12/685,928; 1 page.

USPTO U.S. Appl. No. 12/686,008; 1 page.

USPTO U.S. Appl. No. 13/215,565; 1 page.

USPTO U.S. Appl. No. 13/451,181, 1 page.

Pelley, Steven et al., "Power Routing: Dynamic Power Provisioning in the Data Center", ASPLOS'10, Version 45, No. 3, Pittsburgh PA, Mar. 13-17, 2010, pp. 231-242.

Wang, Xiaorui et al., "SHIP: Scalable Hierarchical Power Control for Large-Scale Data Centers", PACT'09 Proceedings of the 2009 18th International Conference on Parallel Architectures and Compilation Techniques, Raleigh, NC, Sep. 12-16, 2009, 10 pages.

Office Action dated Oct. 11, 2013 for U.S. Appl. No. 13/215,565; 13 pages.

Interview Summary dated Dec. 24, 2013 for U.S. Appl. No. 13/215,565; 11 pages.

Notice of Allowance mailed Feb. 24, 2014 for U.S. Appl. No. 13/215,565; 10 pages.

Response to Office Action filed Jan. 10, 2014, U.S. Appl. No. 13/215,565, 8 pages.

CUSTOMIZED POWER RATING FOR COMPUTER EQUIPMENT

This application is a continuation of application Ser. No. 12/685,928, filed Jan. 12, 2010, status pending.

BACKGROUND

The present application relates generally to an improved data processing apparatus and method and more specifically to an apparatus and method for customized power rating for computer equipment.

Information technology (IT) equipment is required to indicate its power consumption (rating). The rating is used to determine appropriate electrical wiring based on the electrical code. The manufacturer affixes labels to equipment specifying the power rating information, which may include maximum (peak) current, maximum combined wattage, continuous power, or the like. Only installations that adhere to appropriate wiring practices are insurable.

The power consumption of IT equipment depends on the configuration of the equipment and the workload that the equipment runs. To stay within limits, manufacturers rate the equipment for "worst case" conditions (e.g., 35° C., high altitude, etc.), maximum configuration (e.g., all processor sockets full, all drive bays full, all expansion card slots occupied, all memory slots occupied, etc.), and extreme workloads (e.g., linear algebra functions, power virus, etc.).

Data center and IT operators request an amount of power from the power company based on the power rating of the equipment. Insurance companies determine how much power the equipment can consume and still be insurable. However, computer equipment seldom uses the amount of power indicated by the manufacturer's power rating, which results in unnecessary capital investments that impede IT growth.

SUMMARY

In one illustrative embodiment, a method is provided in a data processing system for customized power rating for computer equipment. The method comprises receiving a default power limit for a computer device, recording actual case power information for the computer device based on an actual configuration and workload of the computer device, and applying an actual case power limit to the computer device, wherein the actual case power limit is determined based on the recorded actual case power information.

In another illustrative embodiment, a method is provided in a data processing system for customized power rating for computer equipment. The method comprises rating a computer device based on a worst case configuration and workload of the computer device to generate a default power limit for the computer device and providing an electrical rating sticker for the computer device. The electrical rating sticker indicates the default power limit for the computer device. The method further comprises receiving, from a customer, actual case power information for the computer device based on an actual configuration and workload of the computer device, determining an actual case power limit for the computer device based on the received actual case power information, and returning to the customer a certificate defining the actual case power limit.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for customized power rating for computer equipment. A power monitor determines actual power consumption by computer equipment in a facility. After equipment has been stressed, an operator sends the actual power consumption information to the manufacturer. The manufacturer receives the actual power consumption information and issues a certificate that acknowledges the equipment will not consume more power than what was measured. The manufacturer may provide digital media that instructs power management hardware in the computer equipment to adhere to an actual case power limit. The power management hardware treats the actual case power limit as a hard power limit. That is, the power management hardware will not specify an operational power cap higher than the actual case power limit. The power management hardware prevents the equipment from crossing the operational power cap, thus enforcing the new certificate.

In one example embodiment, the manufacturer may issue the certificate as a label that specifies the actual case power limit. The operator may place the label over the original power rating label. In one embodiment, the label may contain a radio frequency identifier (RFID) sensor that provides a signal when close to the power management hardware. The RFID may communicate the actual case power limit information. In another embodiment, the manufacturer may provide a digital medium, such as a flash memory card or the like, containing the actual case power limit information. The operator may insert the digital medium into the equipment so that the power management hardware can read the actual case power limit information. The operator may cover the digital medium with the label. The RFID sensor or digital medium may be encoded such that it only works in the equipment that matches the same serial number.

Figure 1:
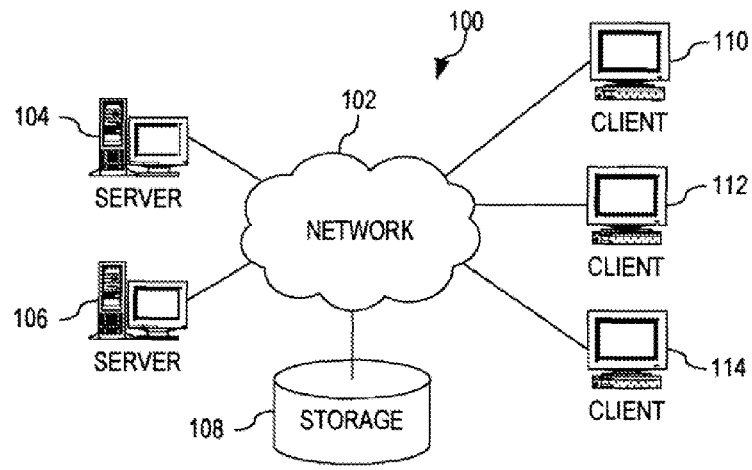
FIG. 1 depicts a pictorial representation of an example distributed data processing system in which aspects of the illustrative embodiments may be implemented.
Figure 2:
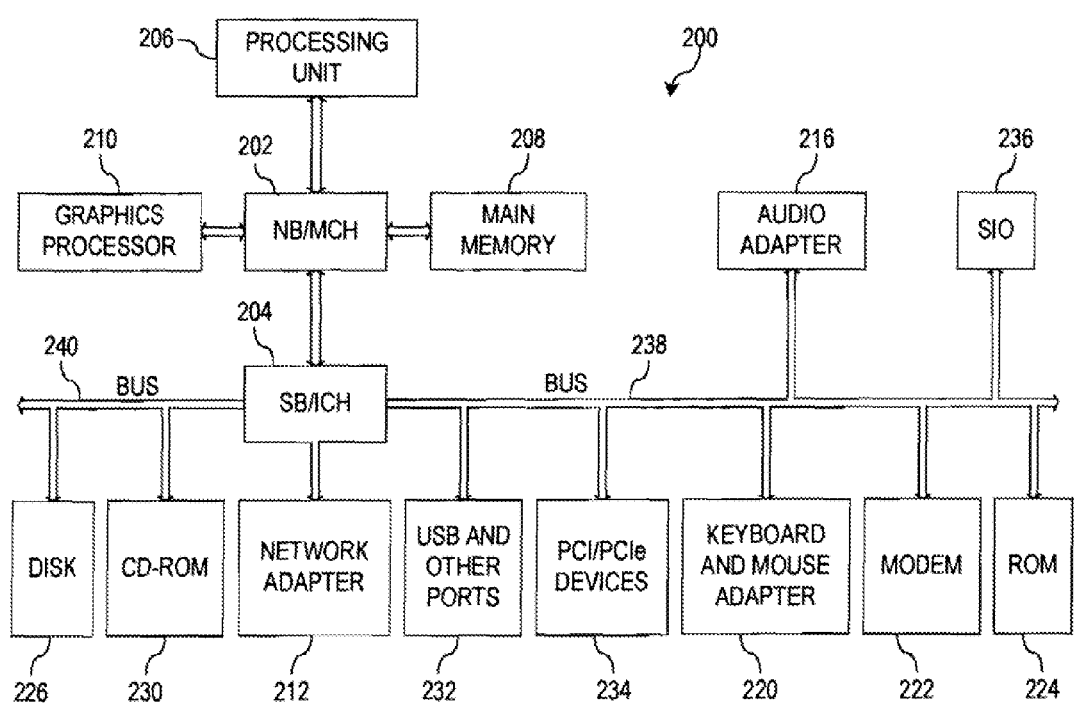
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments in which computer equipment operates under customized power ratings.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at feast one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
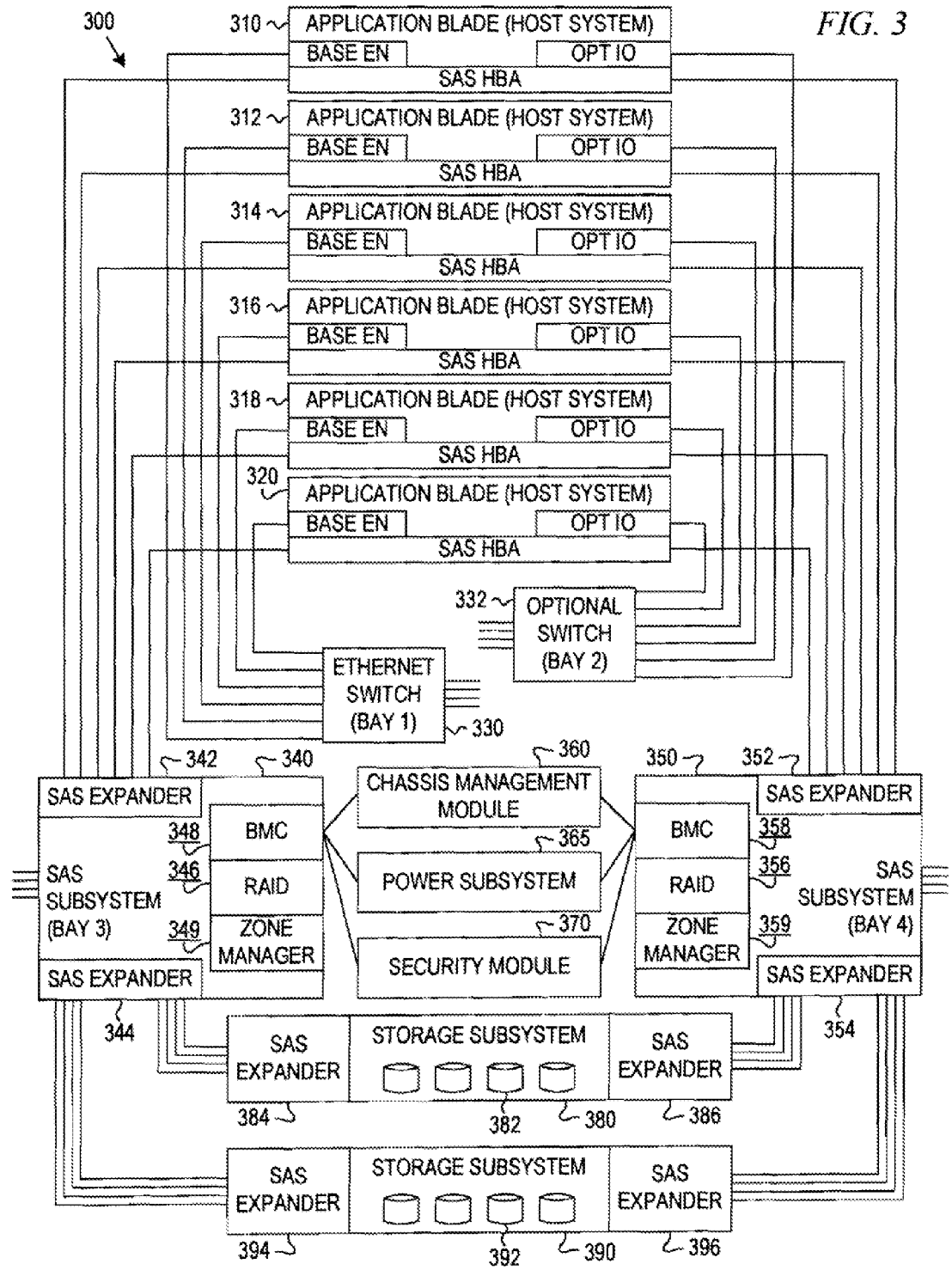
FIG. 3 is a diagram illustrating an example of information technology computer equipment in which aspects of the illustrative embodiments may be implemented.

FIG. 3 is a diagram illustrating an example of information technology computer equipment in which aspects of the illustrative embodiments may be implemented. Data processing system 300 is an example of a computer, such as server 104 in FIG. 1, in which computer usable code or instructions implementing the processes for illustrative embodiments may be located. As shown in FIG. 3, data processing system 300 may be provided in a chassis, such as a BladeCenter® chassis available from International Business Machines Corporation of Armonk, N.Y. Within the chassis, a plurality of host servers or host systems may be provided on application blades 310-320. Each host servers 310-320 may have one or more input/output adapters including a base Ethernet (base EN) adapter for communication with an Ethernet switch 330, an optional I/O (opt I/O) adapter for communication with an optional switch 332, and SAS host bus adapter (SAS HBA) for communication with SAS subsystems 340 and 350. In addition to these elements, a chassis management module 360, power subsystem 365, and security module 370 may be provided within the chassis for performing various management, power, and security functions. The elements of the chassis communicate with one another via a SAN fabric.

The SAN fabric may include connections, such as wired links, wireless communication links, fiber optic cables, or the like. The SAN fabric may utilize one or more communication protocols including, for example, Fibre Channel, Ethernet, or the like. In the depicted example, the SAN fabric uses SAS to communicate between the application blades 310-320 and the storage subsystems 380 and 390 via the SAS subsystems 340 and 350.

The SAS subsystems 340 and 350 operate as switches in the SAN fabric and controllers for accessing the storage subsystems 380 and 390. As shown in FIG. 3, the storage subsystems 380 and 390 are comprised of a plurality of storage devices 382 and 392, respectively, which are accessed via one or more SAS expanders 384, 386, 394, and 396. The storage devices 382 and 392 may comprise a single disk drive, tape drive, optical drive, or a plurality of such storage devices, such as in a disk array. For example, the storage device 382 may comprise a disk array, such as a Redundant Array of Independent Disks (RAID) system with the disk devices in the RAID system being Just a Bunch of Disks (JBOD) devices and/or Switched Bunch of Disks (SBOD) systems.

The SAS subsystems 340 and 350 may themselves comprise a host side SAS expander 342, 352, and a storage subsystem side SAS expander 344, 354. The SAS expanders 342, 344, 352, 354, 384, 386, 394, and 396 may be configured to support zoning. Moreover, the SAS subsystems 340 and 350 may further comprise storage subsystem controllers, such as RAID controllers 346 and 356, blade management controllers (BMC) 348 and 358, and at least one zone manager 349 and 359. The RAID controllers 346 and 356 perform various control operations for controlling operation and access to the storage subsystems 380 and 390. The BMCs 348 and 358 perform various management operations for managing the application blades 310-320 of the chassis. The BMCs 348 and 358 may communicate with the chassis management module 360 to obtain vital product data (VPD) for the various application blades 310-320 and storage subsystems 380 and 390.

As seen in FIG. 3, data processing system 300 may contain many multiple function components, such as application blades, SAS subsystems, storage subsystems, and the like. These multiple function components may be embodied in a blade or other self-contained package that is easily removed and replaced. A multiple function component may take the form of a customer replaceable unit (CRU), which is a circuit board, part, or assembly that can be quickly and easily removed from a data processing system or other piece of electronic equipment and replaced by the customer or a technician without having to send the entire product or system to a repair facility. For example, a blade may have its own CPU, memory, and hard disk, where each function within the blade may operate independently.

A manufacturer may give a power rating to data processing system 300 based on a worst case. That is, the manufacturer may determine the maximum power that can be consumed by data processing system 300 based on assumptions such as all application blades 310-320 are occupied, all storage devices 382 and 392 are present, and application blades 310-320 are running an extreme workload. The manufacturer provides the computer equipment with a power rating label, which is typically a sticker placed on the power supply. However, in practice a customer may not use data processing system 300 to its capacity. In fact, a customer will typically operate well below the full capacity of data processing system 300.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

Figure 4:
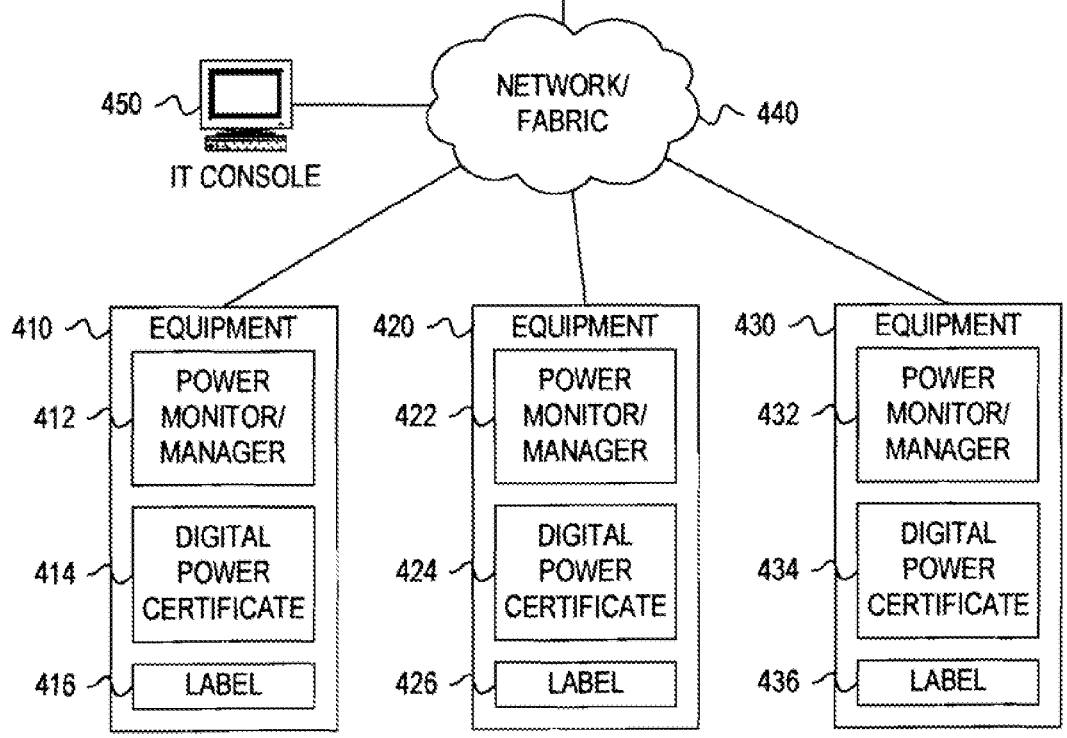
FIG. 4 is a block diagram depicting a data processing system for customized power rating for computer equipment in accordance with an illustrative embodiment.

FIG. 4 is a block diagram depicting a data processing system for customized power rating for computer equipment in accordance with an illustrative embodiment. A data center may comprise computer equipment 410, 420, 430 connected through a network or communication fabric 440. An information technology console 450 may also be connected to network/fabric 440. Computer equipment 410, 420, 430 may include servers, such as data processing system 104 in FIG. 1 or data processing system 300 in FIG. 3, client computers, such as clients 110-114 in FIG. 1, storage, routers, switches, or any computer equipment that operates under a power rating.

Computer equipment 410, 420, 430 comprise labels 416, 426, 436, respectively. Initially labels 416, 426, 436 are the original labels provided by the manufacturer that define the power ratings based on "worst case" conditions. In accordance with the illustrative embodiment, an information technology (IT) customer runs computer equipment 410, 420, 430 for a period of time under customer's conditions and workloads. Computer equipment 410, 420, 430 comprise power monitors and power managers 412, 422, 432, respectively. For example, power monitor/manager 412 records power statistics for computer equipment 410. Power monitor/manager 412 may be embodied within power subsystem 365 in FIG. 3, for example. After a period of time, such as 30 days, for example, IT console 450 allows an operator to send actual case power information to manufacturer server 404 via network 402. The actual case power information may include, for example, the machine serial number, average power consumption (or average alternating current (AC) current and voltage), and maximum power consumption (or maximum AC current and voltage).

Upon receiving the actual case power information at manufacturer server 404, the manufacturer may prepare a new certificate, which may comprise a new electrical rating label based on the actual case information. The new electrical rating label may be a tamper resistant and/or tamper evident sticker. The manufacturer new certificate may also comprise digital media, which may be digitally signed by the manufacturer. For example, the electrical rating label may have an embedded radio frequency identifier (RFID) device storing the serial number of the machine and power limit based on the actual case power information. This new power limit is an "actual case" power limit, because it is based on the power statistics recorded during actual operation of the computer equipment.

Upon receiving the new certificate with the associated digital media, the customer locates the equipment within equipment 410, 420, 430 to which the certificate applies. The customer may then install the digital power certificate 414, 424, or 434 within respective equipment 410, 420, or 430. For example, for equipment 410, the IT customer may install digital power certificate 414, which may comprise placing an electrical rating sticker over label 416 and/or inserting a digital medium into equipment 410. In one example embodiment, digital power certificate 414 may comprise a tamper resistant or tamper evident sticker. In one embodiment, the sticker may have an embedded RFID device that stores digitally signed data with the serial number of equipment 410 and power limit. In another example embodiment, digital power certificate 414 may include a digitally signed medium, such as a flash memory storing the serial number of equipment 410 and power limit.

From that point forward, the equipment, such as equipment 410 in the above example, continues to operate enforcing the new power limit based on the actual power information. Power monitor/manager 412 communicates with digital power certificate 414 to receive the actual case power limit and enforces a power cap that does not exceed the actual case power limit.

Reconfiguration or other changes may result in more or less power being used. In this case, the operator may recalibrate computer equipment 410, 420, 430, and the manufacturer may issue another digital power certificate. In one example embodiment, the actual case power limit may include a buffer to allow for reconfiguration or other changes in the operation environment.

In an example embodiment, after power monitor/manager 412, 422, or 432 is configured with the actual case power limit, power monitor/manager 412, 422, or 432 may detect that equipment 410, 420, or 430 reaches the neighborhood of the power limit. In this instance, power monitor/manager 412, 422, or 432 may advise an operator to recalibrate. The operator may simply remove digital power certificate 414, 424, or 434 to operate in accordance with the "worst case" power limit. The operator may also recalibrate equipment 410, 420, or 430 and send new power information to manufacturer server 404 to generate a new power certificate. In one example embodiment, equipment 410, 420, or 430 may detect hardware changes that may affect power consumption. For example, chassis management module 360 in FIG. 3 may detect a new application blade or storage device. In this instance, the equipment itself may prompt an operator to recalibrate. In an alternative embodiment, power monitor/manager 412, 422, or 432 may detect that power has stayed far below the power limit for an extended period of time, indicating that the workload has changed. In this case, the operator may determine whether to recalibrate to lower the actual case power limit.

The illustrative embodiments allow an IT customer to configure computer equipment to operate according to actual case power consumption. That is, the IT customer may purchase an appropriate amount of power from the power company and insure the equipment based on actual power consumption rather than a worst case configuration. Thus, capital that would otherwise be devoted to securing power and insurance for computer equipment that is operating well below the default electrical power rating may be invested in IT growth.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc., or any suitable combination thereof.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5A:
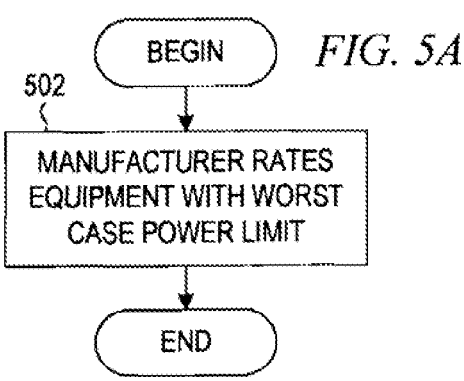
FIGS. 5A-5E are flowcharts outlining example operations of providing customized power ratings for computer equipment in accordance with an illustrative embodiment.

FIGS. 5A-5E are flowcharts outlining example operations of providing customized power ratings for computer equipment in accordance with an illustrative embodiment. More particularly, FIG. 5A illustrates operation of a manufacturer for providing a default power rating for computer equipment in accordance with an illustrative embodiment. Operation begins, and the manufacturer rates equipment with a worst case power limit (block 502). Thereafter, operation ends.

Figure 5B:
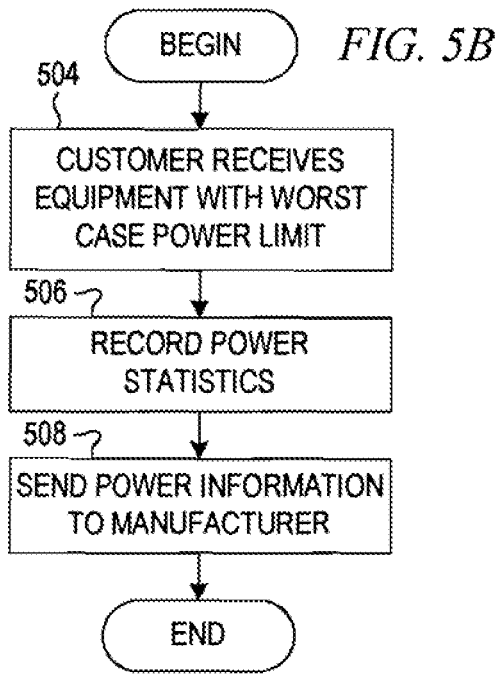

FIG. 5B illustrates operation of an IT customer for recording power statistics in accordance with an illustrative embodiment. Operation begins, and the customer receives the equipment with the worst case power limit (block 504). The customer records power statistics based on actual case operation of the computer equipment (block 506). For instance, the computer equipment may comprise a power monitor that records power statistics. The customer then sends the actual case power information to the manufacturer (block 508). The actual case power information may comprise, for example, a machine serial number for the equipment, average power consumption (or average AC current and voltage), and maximum power consumption (or maximum AC current and voltage). Thereafter, operation ends.

Figure 5C:
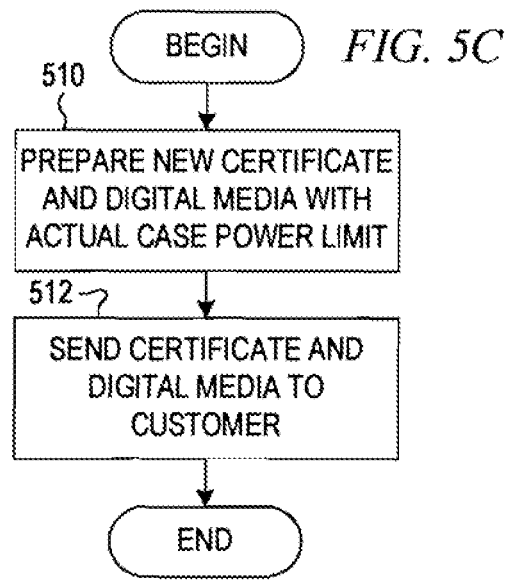

FIG. 5C illustrates operation of a manufacturer for providing a customized power rating for computer equipment in accordance with an illustrative embodiment. The manufacturer prepares a new certificate and digital media with an actual case power limit based on the actual case power information received from the customer (block 510). The certificate and digital media may comprise, for example, a tamper resistant or tamper evident electrical rating sticker, a RFID device, and/or a storage device such as a flash memory device. The manufacturer then sends the new certificate and digital media to the customer (block 512). Thereafter, operation ends.

Figure 5D:
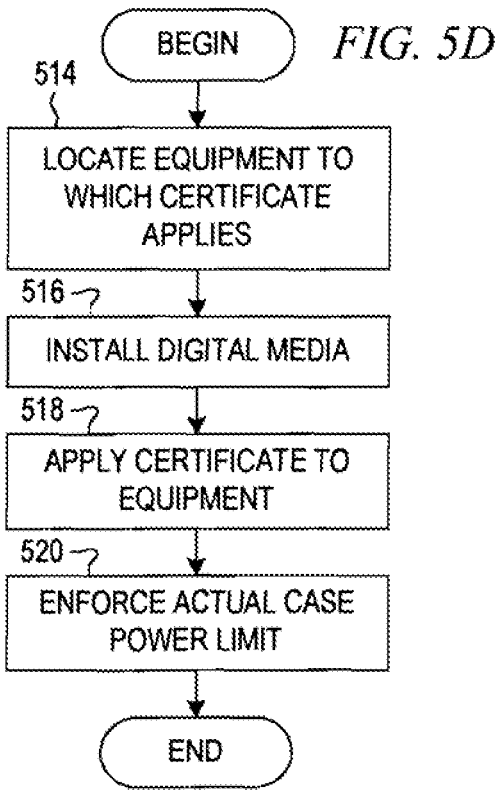

FIG. 5D illustrates operation of an IT customer for applying the new certificate to the computer equipment in accordance with an illustrative embodiment. Operation begins when the customer receives the new certificate and digital media, and the customer locates the equipment to which the certificate applies (block 514). The customer installs the digital media in the equipment (block 516) and applies the certificate to the equipment (block 518). Installing the digital media may comprise inserting a storage device, such as a flash memory, for example, into the computer equipment. Alternatively, installing the digital media may comprise moving an RFID device within a communication range of the power management component of the equipment. Applying the certificate to the equipment may comprise placing an electrical rating sticker on the computer equipment. The computer equipment then enforces the actual case power limit (block 520). Thereafter, operation ends.

Figure 5E:
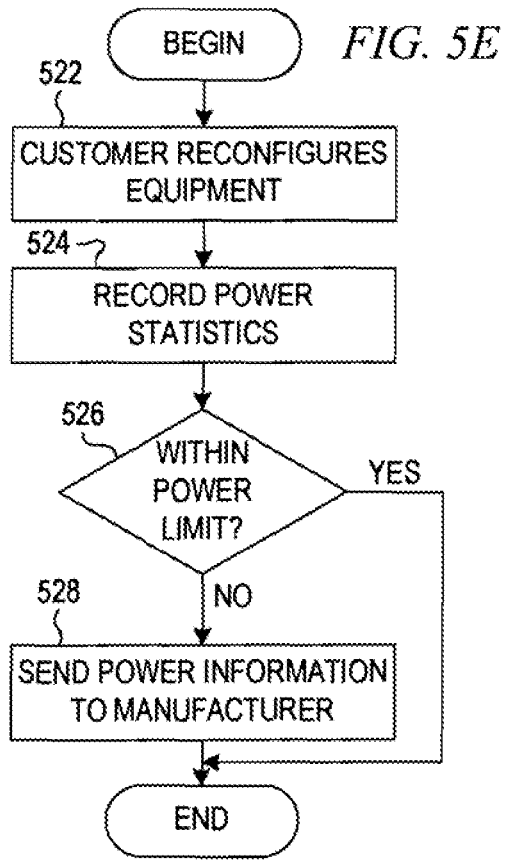

FIG. 5E illustrates operation of an IT customer for reconfiguring computer equipment with a customized power rating in accordance with an illustrative embodiment. Operation begins, and the customer reconfigures the equipment (block 522). The customer may reconfigure the equipment by adding or removing a hardware component from the computer equipment, increasing or decreasing the workload of the computer equipment, enabling or disabling hardware or software features of the computer equipment, or the like. In an alternative embodiment, a power management component of the computer equipment may detect reconfiguration based on hardware, software, or workload changes without explicit input from the operator. The computer equipment then records power statistics for the actual case operation of the computer equipment after the reconfiguration (block 524). The power monitor and power management component of the computer equipment then determines whether the recorded power statistics are within the current actual case power limit (block 526).

If the power monitor and power management component of the computer equipment determines that the recorded power statistics are within the current actual case power limit, then operation ends. If the power monitor and power management component of the computer equipment determines that the recorded power statistics are not within the current actual case power limit in block 526, then the customer sends the new actual case power information to the manufacturer (block 528). The power monitor and power management component of the computer equipment may determine that the recorded power statistics are not within the current actual case power limit if the recorded power statistics are too close to the current actual case power limit (the power management system guarantees the equipment will not consume more power than the actual case power limit, but being close to this limit indicates the performance of the equipment might be constrained). Alternatively, the power monitor and power management component of the computer equipment may determine that the recorded power statistics are not within the current actual case power limit if the recorded power statistics stay well below the current actual case power limit for an extended period of time. Thereafter, operation ends, and the manufacturer may prepare a new certificate and digital media based on the new actual case power information.

Thus, the illustrative embodiments provide mechanisms for customized power rating for computer equipment. A power monitor determines actual power consumption by computer equipment in a facility. After equipment has been stressed, an operator sends the acetal power consumption information to the manufacturer. The manufacturer receives the actual power consumption information and issues a certificate that acknowledges the equipment will not consume more power than what was measured. The manufacturer may provide digital media that instructs power management hardware in the computer equipment to adhere to an actual case power limit. The power management hardware treats the actual case power limit as a hard power limit. That is, the power management hardware will not specify a power cap higher than the actual case power limit. The power management hardware prevents the equipment from crossing the actual case power limit.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for customized power rating for computer equipment, the method comprising:
   receiving a default power limit for a computer device;
   recording actual case power consumption for the computer device based on an actual configuration and workload of the computer device;
   applying an actual case power limit to the computer device, wherein the actual case power limit is determined based on the recorded actual case power consumption;
   responsive to a customer reconfiguring the computer device to form a new configuration, recording new actual case power consumption for the computer device based on the new configuration and workload of the reconfigured computer device;
   determining whether the reconfigured computer device operates within the actual case power limit; and
   responsive to the reconfigured computer device not operating within the actual cased power limit, applying a new actual case power limit to the reconfigured computer device, wherein the new actual case power limit is determined based on the recorded new actual case power consumption.

2. The method of claim 1, wherein receiving a default power limit for a computer device comprises receiving an electrical rating sticker on the computer device.

3. The method of claim 2, wherein the default power limit is based on a worst case configuration and workload of the computer device.

4. The method of claim 1, wherein applying an actual case power limit to the computer device comprises:
sending the recorded actual case power consumption to a manufacturer of the computer device; and
receiving a certificate defining the actual case power limit from the manufacturer.

5. The method of claim 4, wherein the certificate comprises an electrical rating sticker.

6. The method of claim 4, wherein the certificate comprises a digital medium that stores the actual case power limit.

7. The method of claim 6, wherein the digital medium is one of a radio frequency identifier device or a flash memory.

8. The method of claim 4, wherein the certificate comprises a tamper-proof or temper-evident electrical rating sticker having an embedded radio frequency identifier device on the computing device.

9. The method of claim 1, wherein applying an actual case power limit to the computer device comprises:
setting a power cap that does not exceed the actual case power limit.

10. The method of claim 1, wherein receiving a default power limit for the computer device comprises receiving a tamper-proof or temper-evident electrical rating sticker having an embedded radio frequency identifier device on the computing device.

11. A method, in a data processing system, for customized power rating for computer equipment, the method comprising:
rating a computer device based on a worst case configuration and workload of the computer device to generate a default power limit for the computer device;
providing an electrical rating sticker for the computer device, wherein the electrical rating sticker indicates the default power limit for the computer device;
receiving, from a customer, actual case power consumption for the computer device based on an actual configuration and workload of the computer device;
determining an actual case power limit for the computer device based on the received actual case power consumption;
returning to the customer a certificate defining the actual case power limit;
responsive to the customer reconfiguring the computer device to form a new configuration, receiving from the customer new actual case power consumption for the computer device based on the new configuration and workload of the reconfigured computer device;
determining whether the reconfigured computer device operates within the actual case power limit;
responsive to the reconfigured computer device not operating within the actual cased power limit, determining a new actual case power limit, to the reconfigured computer device based on the recorded new actual case power consumption; and
returning to the customer a new certificate defining the new actual case power limit.

12. The method of claim 11, wherein the certificate comprises a second electrical rating sticker.

13. The method of claim 11, wherein the certificate comprises a digital medium that stores the actual case power limit.

14. The method of claim 13, wherein the digital medium is one of a radio frequency identifier device or a flash memory.

15. The method of claim 11, wherein the certificate comprises a tamper-proof or temper-evident electrical rating sticker having an embedded radio frequency identifier device on the computing device.

16. The method of claim 11, wherein the customer sets a power cap that does not exceed the actual case power limit.

* * * * *